Patented July 13, 1937

2,086,585

UNITED STATES PATENT OFFICE 2,086,585

QUATERNARY AMMONIUM COMPOUNDS

Ludwig Taub and Friedrich Leuchs, Wuppertal-Elberfeld, Germany, assignors, by mesne assignments, to Alba Pharmaceutical Company, Inc., New York, N. Y., a corporation of New York No Drawing. Application April 7, 1934, Serial No. 719,600. In Germany April 13, 1933

5 Claims. (Cl. 260—127)

This invention relates to quaternary ammonium compounds which display bactericidal and fungicidal properties.

In accordance with the present invention quaternary ammonium compounds displaying bactericidal and fungicidal properties are obtainable by the manufacture of such quaternary ammonium compounds which contain attached to the nitrogen at least one higher molecular aliphatic radical which is interrupted by at least one ether-like bound sulfur atom or by a nitrogen atom in the form of an amino group, and which contain otherwise only saturated organic radicals as substituents. The higher molecular aliphatic radicals interrupted by sulfur or nitrogen atoms preferably contain 8 to 20 carbon atoms. They may contain substituents, such as the hydroxyl, alkoxy and amino groups and halogen atoms. It may be mentioned that when using the term "higher molecular aliphatic radical interrupted by a sulfur or nitrogen atom" in the specification and in the appended claims it is intended to include also the said substitution products of such higher molecular aliphatic radicals. The other saturated organic radicals are preferably saturated lower alkyl groups but also higher alkyl groups containing 8 to 18 carbon atoms or cyclo-aliphatic groups, for instance, the cyclopentyl- or cyclohexyl group may be present as saturated substituent in the new quaternary ammoium compounds.

The new quaternary ammonium compounds specified above may be prepared according to the methods known per se, for instance, by reacting upon a saturated primary, secondary or tertiary amine with an ester of a higher molecular aliphatic alcohol containing an interrupting ether-like bound sulfur or a nitrogen atom. In case secondary or tertiary amines are obtained by such reaction they are transformed into quaternary compounds by the action of reactive esters of saturated alcohols. Esters particularly suitable for the said purpose are the hydrohalic and benzene sulfonic acid esters of the said alcohols. The reaction is normally performed with heating, if desired or required with the addition of a solvent or diluent. Alternatively one may start with such amines which contain a higher molecular aliphatic radical interrupted by sulfur or nitrogen and transform these amines into the corresponding quaternary ammonium compounds by the action of reactive esters of saturated alcohols.

The ammonium compounds thus obtainable are in part crystalline, in part thickly liquid substances which in general readily dissolve in water.

The invention is further illustrated by the following examples without being restricted thereto:—

*Example 1.*—250 parts by weight of dodecyl-thiomethylchloride, obtained by the introduction of hydrogen chloride into a mixture of dodecyl-mercaptane and formaldehyde as a colorless liquid boiling at 157–160° C. (under 7 mm. pressure), are heated with 60 parts by weight of trimethylamine and 300 parts by weight of benzene for about 2 hours to 70–80° C. After cooling the separated trimethyl-dodecylthiomethyl-ammoniumchloride is sucked off, washed with cold benzene and redissolved from acetic ester. Colorless bright leaflets melting at 180° C. which are soluble in water are thus obtained.

When using instead of trimethylamine the corresponding quantity of tributylamine, tributyl-dodecylthiomethyl-ammoniumchloride is obtained in the form of whitish water-soluble crystals.

*Example 2.*—250 parts by weight of dodecyl-thiomethylchloride are heated with 213 parts by weight of dimethyldodecylamine for 1 hour to 80–90° C. On redissolving of the reaction product from acetic ester, the dimethyldodecyl-dodecyl-thiomethyl-ammoniumchloride is obtained in colorless bright leaflets melting at 164–165° C., which are soluble in water.

*Example 3.*—250 parts by weight of dodecyl-thiomethylchloride are treated with 89 parts by weight of dimethylaminoethanol while continuously stirring the mixture. After the reaction temperature has gone down the crystal paste obtained is triturated with cold benzene, sucked off and redissolved from methylalcohol. The dimethyl-hydroxyethyl-dodecylthiomethyl-ammoniumchloride forms a crystalline colorless powder having no distinct melting point and being soluble in water.

When using instead of dimethylaminoethanol the corresponding quantity of triethanolamine, trihydroxyethyl-dodecylthiomethyl-ammoniumchloride is obtained in the form of colorless crystals which do not have a characteristic melting point.

*Example 4.*—245 parts by weight of diethyl-octylthioethylamine are dissolved in 1000 parts by weight of benzene, 142 parts by weight of methyl-iodide are added and the mixture is heated in a closed vessel for 5 hours. After distilling off the benzene the methyl-diethyl-octylthioethyl-ammoniumiodide is obtained as a yellowish viscous sirup which after prolonged standing crystallizes and is soluble in water.

The diethyl-octylthioethylamine which is necessary for performing the reaction is obtained from octylthioethylchloride boiling at 145° C. under 2 mm. pressure and diethylamine as a colorless liquid boiling at 155-160° C. under 3 mm. pressure.

For certain purposes it is advisable to use the quaternary ammonium compounds described above in the form of salts with acids other than the hydrohalic acids. In such cases the hydrohalic acid salts can be transformed in the manner known per se into salts with other mineral or organic acids, for instance, into salts of nitric, sulfuric, alkyl- and phenyl sulfonic, phosphoric, formic, acetic, lactic, citric, tartaric, benzoic, salicyclic acid and the like. If the free quaternary ammonium bases are to be used they may be liberated from their salts by the addition of strong alkali, such as potassium or sodium hydroxide in the usual manner. The free ammonium bases are in part crystalline, in part thickly liquid hygroscopic substances which dissolve in organic solvents, such as alcohols, acetic ester, and in water with strong alkaline reaction.

We claim:—

1. Dodecylthiomethyl - trimethylammonium - chloride, which is a crystalline, water-soluble product.

2. Quaternary ammonium compounds containing only one quaternary nitrogen atom which is once substituted by a higher molecular aliphatic radical of 8 to 20 carbon atoms which is interrupted by one ether-like bound sulfur atom and which quaternary nitrogen atom is otherwise substituted only by saturated lower alkyl groups as organic substituents and by an anion selected from the group consisting of the hydroxyl group and the anions of organic and mineral acids.

3. Quaternary ammonium compounds containing only one quaternary nitrogen atom which is once substituted by an alkyl-thioalkyl group of 8 to 20 carbon atoms and 434/A. which quaternary nitrogen atom is otherwise substituted only by saturated lower alkyl groups as organic substituents and by an anion selected from the group consisting of the hydroxyl group and the anions of organic and mineral acids.

4. Quaternary ammonium compounds containing only one quaternary nitrogen atom which is once substituted by an alkyl-thioalkyl group of 8 to 20 carbon atoms and which quaternary nitrogen atom is otherwise substituted only by saturated lower alkyl groups as organic substituents and by the anion of a mineral acid.

5. Quaternary ammonium halides containing only one quaternary nitrogen atom which is once substituted by an alkyl-thioalkyl group of 8 to 20 carbon atoms and which quaternary nitrogen atom is otherwise substituted only by saturated lower alkyl groups as organic substituents and by the anion of a hydrohalic acid.

LUDWIG TAUB.
FRIEDRICH LEUCHS.